US006764410B2

(12) United States Patent
Apple et al.

(10) Patent No.: US 6,764,410 B2
(45) Date of Patent: Jul. 20, 2004

(54) CONSOLES FOR PLAYING AND/OR SCORING GAMES, INTERNET ACCESS, AND COMMUNICATION

(75) Inventors: David L. Apple, Spring Lake, MI (US); Roland C. Bouchard, Grand Rapids, MI (US); Gary A. Brouwers, Allendale, MI (US); Michael A. Cutlip, Coopersville, MI (US); David L. Mowers, Muskegon, MI (US); Robert J. Prinz, Muskegon, MI (US); Troy A. Recknagel, Muskegon, MI (US); Timothy J. Ryan, Whitehall, MI (US)

(73) Assignee: Brunswick Bowling & Billiards Corporation, Muskegon, MI (US)

(*) Notice: Subject to any disclaimer, the term of this patent is extended or adjusted under 35 U.S.C. 154(b) by 0 days.

(21) Appl. No.: 10/016,598

(22) Filed: Dec. 10, 2001

(65) Prior Publication Data

US 2002/0147514 A1 Oct. 10, 2002

Related U.S. Application Data

(63) Continuation of application No. PCT/US00/15716, filed on Jun. 8, 2000.
(60) Provisional application No. 60/138,926, filed on Jun. 11, 1999.

(51) Int. Cl.[7] ............................................... A63D 5/04
(52) U.S. Cl. ...................... 473/70; 700/91; 340/323 B; 463/42
(58) Field of Search ............................. 463/1, 9, 29–30, 463/36, 39–40, 42; 473/54, 69–71, 55; 700/91–92; 273/148 B; 340/323 R, 323 B; 725/1, 5–7, 86

(56) References Cited

U.S. PATENT DOCUMENTS

| 4,302,010 A | | 11/1981 | Kaenel ......................... 273/54 |
| 4,440,457 A | * | 4/1984 | Fogelman |
| 5,078,399 A | * | 1/1992 | Lennon, Jr. |
| 5,118,105 A | | 6/1992 | Brim et al. .................... 273/54 |
| 5,198,976 A | * | 3/1993 | Form |
| 5,259,613 A | * | 11/1993 | Marnell, II |
| 5,643,083 A | * | 7/1997 | Hasegawa |
| 6,048,272 A | | 4/2000 | Tsujita ........................... 473/70 |
| 6,113,495 A | * | 9/2000 | Walker |
| 6,430,453 B1 | | 8/2002 | Shea |

* cited by examiner

Primary Examiner—Mark Sager
(74) Attorney, Agent, or Firm—Dykema Gossett PLLC

(57) ABSTRACT

A bowling scoring console is disclosed having a housing and a video display monitor mounted in the housing. The console may have one or more of a video game processor, an Internet access device, and a television receiver mounted in the housing and coupled to the display monitor. Methods are also disclosed for using a video game device and an Internet access device in a bowler staging area of a bowling center.

44 Claims, 10 Drawing Sheets

CONSOLES FOR PLAYING AND/OR SCORING GAMES, INTERNET ACCESS, AND COMMUNICATION

CROSS-REFERENCE TO RELATED APPLICATIONS

This application is a continuation under 35 U.S.C. §120 of International PCT Application No. PCT/US00/15716 filed on Jun. 8, 2000, which claims the priority under 35 U.S.C. §119(e) upon U.S. Provisional Patent Application No. 60/138,926, filed on Jun. 11, 1999. The entire disclosures of both the above PCT and provisional applications are incorporated herein by reference. Priority is hereby claimed upon both of these applications.

BACKGROUND OF THE INVENTION

The present invention generally relates to gaming devices, bowling scoring consoles, Internet access and display devices, and communication devices. According to a more specific aspect of the present invention, the invention relates to bowling scoring consoles.

While many bowling centers provide food service, lounge areas, televisions, video arcades, and billiards tables, the primary draw of a bowling center is bowling. While many of the above-noted provisions serve to supplement the entertainment derived from bowling, there remains the need for additional entertainment to be provided at bowling centers that is capable of drawing in people who are not necessarily interested in bowling. Additionally, there exists a need for other forms of entertainment within a bowling center to supplement the entertainment offered by bowling, particularly entertainment for younger children who may not be bowling but rather are accompanying adults to bowling leagues or the like and who are too young to wander around the bowling center or play video games in an arcade, which is typically remote from the bowling lanes where their parents are bowling. Further, there exists the need to provide additional forms of non-bowling related entertainment in bowling centers, particularly for providing such entertainment at the staging area of a bowling center.

SUMMARY OF THE INVENTION

Accordingly, it is an aspect of the present invention to solve the above-noted problems by providing various new forms of entertainment accessible through the bowling scoring consoles located near the staging areas of each of the bowling lanes. To achieve this and other aspects and advantages, a method may be implemented whereby a display monitor is positioned at a staging area of a bowling lane in a bowling center; a video game processor is connected to the display monitor; at least one game controller having a communication link to the video game processor is provided at the staging area of the bowling lane; and playing of a video game is enabled at the staging area of the bowling lane using the game controllers while displaying the video game on the display monitor.

To achieve the above aspects and advantages as well as other aspects and advantages, a method of the present invention may be implemented whereby a display monitor is positioned at a staging area of a bowling lane; an Internet access device is connected to the display monitor; a keypad having a communication link to the Internet access device is provided at the staging area of the bowling lane; and Internet access is enabled at the staging area of the bowling lane using the keypad and the Internet access device while displaying accessed Internet websites on the display monitor.

Alternatively, both video games and Internet access may be made available at the staging area of a bowling lane. Preferably, an Internet access device and/or video game processor are coupled to the display monitor through a bowling scoring console provided for each lane or lane pair. More preferably, the Internet access device and/or video game processor are housed in each of the bowling scoring consoles. In addition, a television receiver may be housed in each scoring console for the selection and display of a television broadcast on a display monitor mounted in the staging area.

According to another aspect of the invention, a kiosk console is provided comprising: a housing; a display monitor provided in the housing; at least one speaker provided in the housing; an Internet access device provided in the housing and coupled to the display monitor and to the speakers, the Internet access device adapted for connection to the Internet for generating display and audio signals corresponding to a selected Internet website; a television receiver provided in the housing and coupled to the display monitor and to the speakers, the television receiver adapted for connection to a source of television signals for generating display and audio signals corresponding to a selected television broadcast signal; and a video game processor provided in the housing and coupled to the display monitor and to the speakers, the video game processor generates display and audio signals in response to a video game program and control signals received from at least one game controller, wherein said display monitor selectively receives display signals and displays at least video game displays, television broadcasts, and Internet websites, and the speakers play audio signals received from the video game processor, the Internet access device, and the television receiver.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
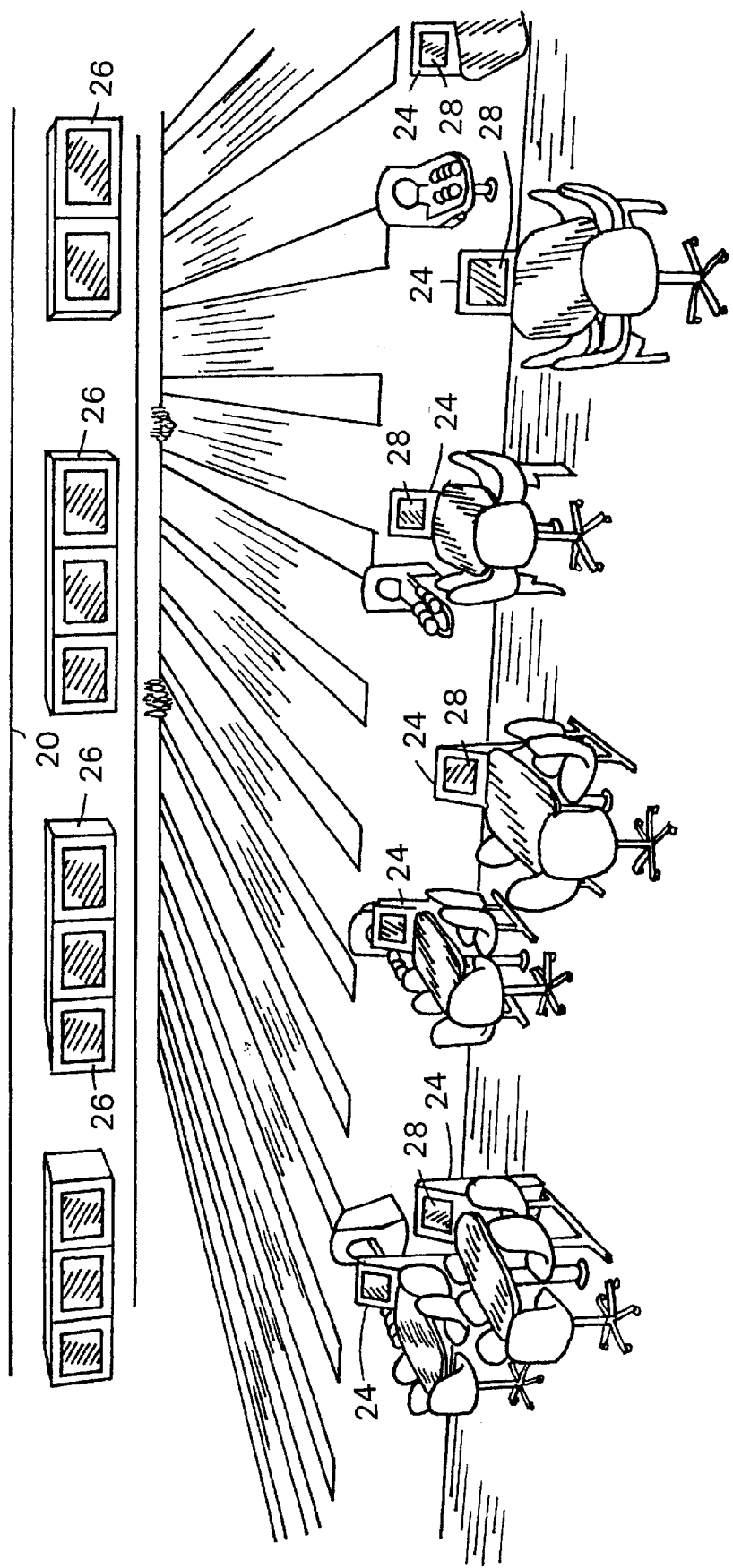
FIG. 1 is a perspective view of a bowling center including a bowling scoring system according to the present invention.

As mentioned above, according to one embodiment of the present invention, a video game processor is provided at the staging area of a bowling lane or pair of bowling lanes. As used and described herein, "the staging area" is the area at the end of the lanes opposite the pin decks where bowlers wait their turns and where they approach the lanes during their turns. Thus, the staging area includes what is commonly referred to as the approach area. Preferably, the video game processor is provided in a bowling scoring console. By providing a video game processor at the staging area of bowling lanes, bowlers or others accompanying the bowlers may play video games that are displayed on the bowling scoring console or on an overhead display monitor associated with the scoring console. This provides supplemental entertainment that can be enjoyed by bowlers and non-bowlers alike. By including the video game processor at the staging area, the adults and children may be entertained by playing the video games without having to move to another area of the bowling center remote from their parents to play arcade-style video games. Thus, groups including bowlers and non-bowlers may remain together and socialize while being entertained by different forms of entertainment.

Another advantage to providing video game processors at the staging areas is the ability to organize video game tournaments using the existing hardware of a bowling scoring system. Bowling centers have unique arrangements, whereby a large number of display monitors are provided in a networked manner such that a person playing a video game on one lane may compete against one or more individuals competing on the same or different lanes in the bowling center. As further described below, the implementation of Internet access within a bowling scoring console may also allow an individual to play a video game in competition with individuals outside of the bowling center, such as at home or at a different bowling center. Thus, tournaments could be organized whereby some or all of the staging areas in one or more bowling centers are used simultaneously to play a particular video game with players who are sitting in the staging area for a lane pair initially playing against one another and the winners of that initial round competing against the winners sitting at staging areas associated with other lane pairs within the same bowling center until a champion has been established for a particular bowling center. Then, the champion of one bowling center may optionally compete against the champion of another bowling center and so on until an overall champion is established for all participating bowling centers. Currently, arcades do not offer such video game tournaments.

To enable spectators to view the ongoing video games, large screen display monitors or projection units and screens may be provided on or in front of the masking unit of the bowling center so as to display certain games of the ongoing competition. Such display screens may be positioned adjacent one another so as to provide an even larger single display when used in combination. Such a large single display could be used to display a single video game display in which all the participants of the bowling center are competing. For example, the single display screen may be used to display the entire layout of a racetrack while individuals at each staging area may drive a race car that is displayed relative to cars driven by other individuals within the bowling center on the displayed racetrack. Each person driving a vehicle may have his/her own display in his/her staging area, showing the view as it would appear looking through the window of the car he or she is driving. Thus, the architecture of the present invention will enable video games to be played on a scale not previously possible.

According to another embodiment of the present invention, an Internet access device is provided at the staging area for each lane or lane pair. Preferably, the Internet access device is provided in a bowling scoring console. By providing an Internet access device at the staging area, individuals may access and browse the Internet in the same manner as they could while sitting at a home or office computer. Thus, all the advantages of Internet access would be available to bowlers and non-bowlers alike. For example, parents could access web cameras located within their home through their own personal web page, and hence, check on their children and babysitter at home without having to leave their bowling lane. Also, bowlers could shop on-line or perform any task currently available on the Internet or as may become available in the future. Further, individuals could gamble (where legal) using websites or programs. For example, individuals could play an on-line slot machine or bet on horse races and watch web or television broadcasts of the race on which they are betting right at their bowling lane.

Another advantage to providing Internet access at a bowling center is that it would allow a bowler who participates in a bowling league to bowl his or her bowling games in advance or at a different bowling center and have his or her bowling scores transmitted to the bowling center where the bowling league bowls via electronic communication over the Internet. Each bowling scoring console could be configured so as to enable access of a list of bowling centers having this capability so that a bowler may bowl his or her games at a different bowling center and then select, on the console screen, the bowling center where the league bowls so as to transmit the bowling scores to the appropriate bowling center. The transmitted bowling score may then be subsequently recalled when the league bowls or the score may be transmitted frame-by-frame to the home bowling center in near real-time to allow the remote bowler to bowl at the regular league time and participate as though the bowler were actually present. Meanwhile, the scores of the other bowlers may be transmitted to the remote bowling center so that the remote bowler may view all the scores. In addition, web cameras may be installed to transmit video of the action to the remote bowling center and vice versa or to any other location. If the bowling center is equipped with an instant replay system such as that disclosed in commonly-assigned U.S. Pat. No. 5,842,929, the cameras used for instant replay may be used as web cameras to transmit video of each bowler's approach and delivery as well as the ball travel and pin fall, and even the bowler's subsequent reaction. The bowlers may communicate with the remote bowler or any other person for that matter, by e-mail, Internet phone call, or instant messaging, such as that available from AOL.

Insofar as the Internet now permits individuals at remote locations to compete against one another in video games, the provision of Internet access from a bowling scoring console along with the use of the game control processor and its associated game controllers or joysticks would allow individuals at a bowling center to compete in video games against anyone else who has Internet access, whether it be someone who is also located in the same bowling center, a different bowling center, or in any other location around the world.

From a marketing standpoint, bowling center proprietors or manufacturers may establish the "homepage" or initial web site that is accessed when the Internet access device is activated. This would allow, for example, a bowling center to display listings of services and products offered at the bowling center or for a bowling product manufacturer to offer bowling balls, bags, and accessories on this initial web site.

Also, by providing a television receiver at the staging area (preferably, in a bowling scoring console), individuals may choose to watch a television broadcast on one of the display monitors of the bowling scoring system. By providing a television receiver in each of the bowling scoring monitors, the individuals sitting nearby that bowling scoring console may select the television station they wish to watch. Such a television broadcast display may be superimposed in picture-in-picture format upon another television broadcast or upon a selected Internet web site, thereby allowing one person to browse the Internet while watching a television broadcast all on the display monitor.

Referring now specifically to the drawings and the illustrative embodiments depicted therein, a bowling center is illustrated in FIG. 1 that includes an automatic scoring system 20 including a bowling scoring processor 22 (FIG. 3) for each lane pair and a plurality of bowling scoring consoles 24 (FIG. 2). Automatic scoring system 20 may additionally include a plurality of overhead display monitors 26 in order to display the same images displayed on display monitors 28 associated with each scoring console 24. However, the images displayed on overhead monitors 26 are not limited to those displayed on scoring consoles 24. For example, if overhead monitors 26 are grouped into three units for each pair of lanes, as illustrated in FIG. 1, then two of the three monitors may display the same graphic images as the scoring consoles 24 associated with the two lanes, with the third monitor displaying other graphic images, such as a television program, video recordings, or the like.

Alternatively, two of the three overhead monitors 26 may display different images than are displayed on displays 28 of the scoring consoles. For example, in accordance with the present invention, monitors 26 may display bowling scores while displays 28 may display a television broadcast or an Internet web site selected by an individual through the scoring console, or may display a video game being played by one or more individuals through one or more of the scoring consoles. As yet another alternative, displays 28 may be used to display bowling scores while overhead monitors 26 are used for display of video games, selected television broadcasts, and/or selected Internet web sites. In either case, the images displayed on each of display monitors 26 and 28 may be selected by individuals through the scoring consoles or by an employee of the bowling center at the front desk. A system for distributing video signals that could be used for this purpose is disclosed in commonly assigned U.S. Pat. No. 5,101,354.

Figure 2A:
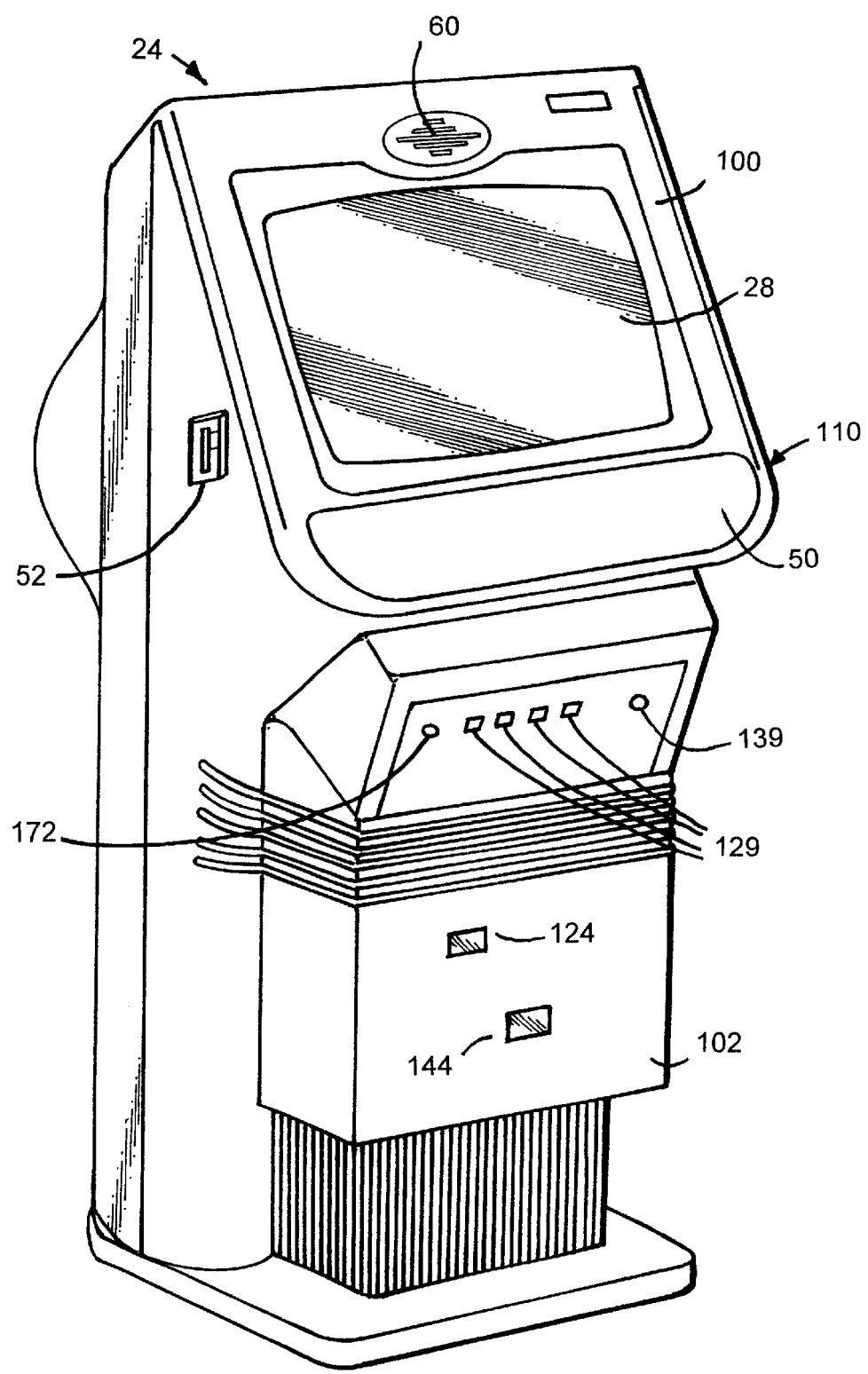
FIG. 2A is a perspective view of a bowling scoring console constructed in accordance with the present invention.
Figure 2B:
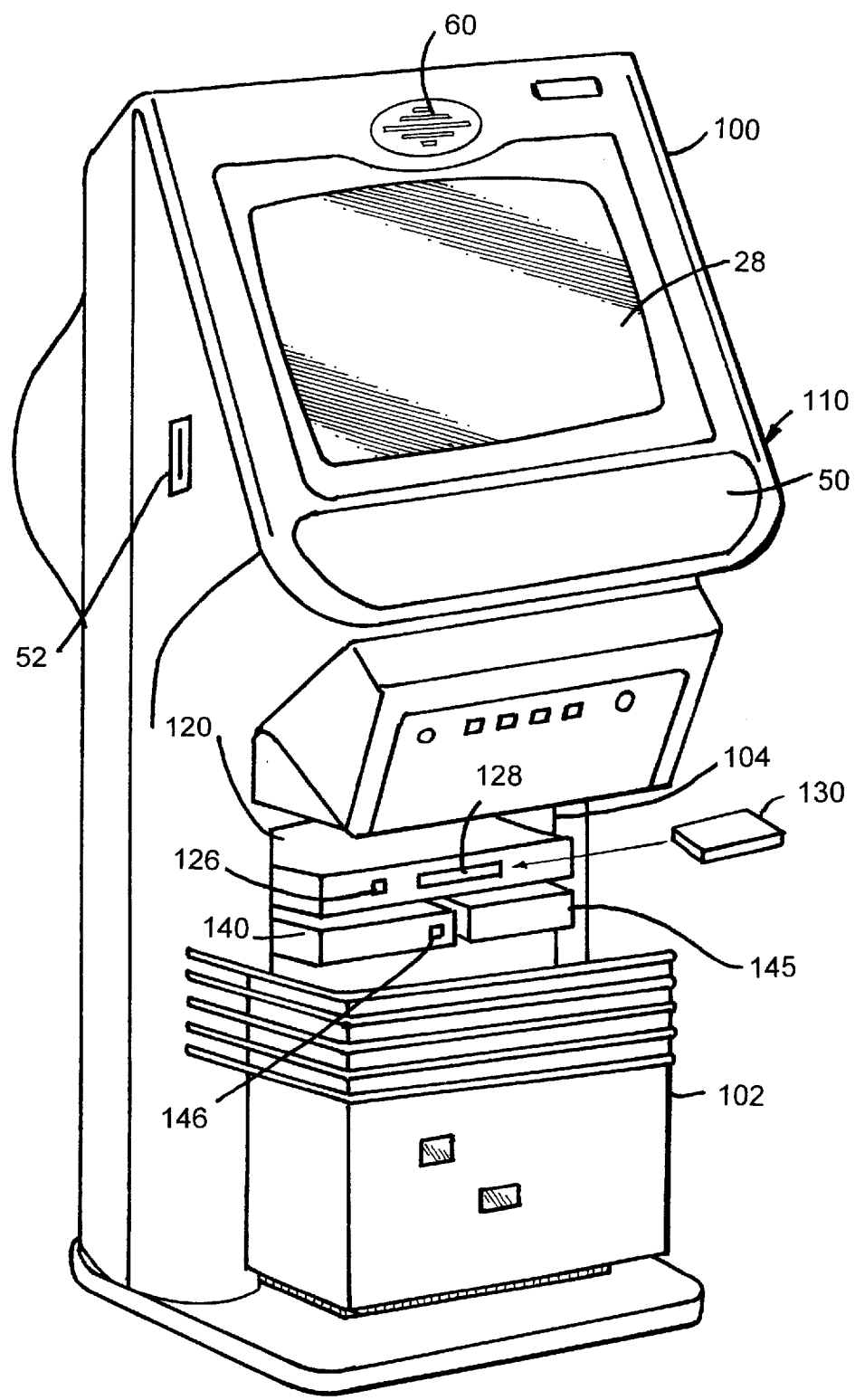
FIG. 2B is a perspective view of the bowling scoring console shown in FIG. 2A, but with an access door shown in an open position.

A bowling scoring console 24 constructed in accordance with the present invention is shown in FIGS. 2A and 2B. Scoring console 24 includes a housing 100 or other support and user input means 110, such as a keypad 50 or a touch screen, provided on housing 100. Console 24 may optionally include a display monitor 28 mounted to housing 100. If console 24 does not include a display 28, the scoring system should include at least one overhead monitor 26 (FIG. 1) per lane pair. Preferably, one scoring console 24 is provided for each bowling lane. It should be noted, however, that one scoring console 24 may be provided for each pair of bowling lanes or for any other grouping of lanes without departing from the present invention.

One bowling scoring processor 22 is preferably provided for each pair of bowling lanes. If one scoring console 24 is provided for each lane, bowling scoring processor 22 may be mounted within housing 100 of that console. On the other hand, if one scoring console 24 is provided for each lane pair, the bowling scoring processor 22 for the lane pair may be mounted within the housing of either console 24 for that lane pair. Alternatively, bowling scoring processor 22 need not be mounted in the housing of any scoring console, but may be mounted elsewhere provided electrical connections may be readily made between scoring processor 22, input means 110, and display monitors 26 and 28 (if present) of the scoring console(s) for the associated lane pair.

Figure 3:
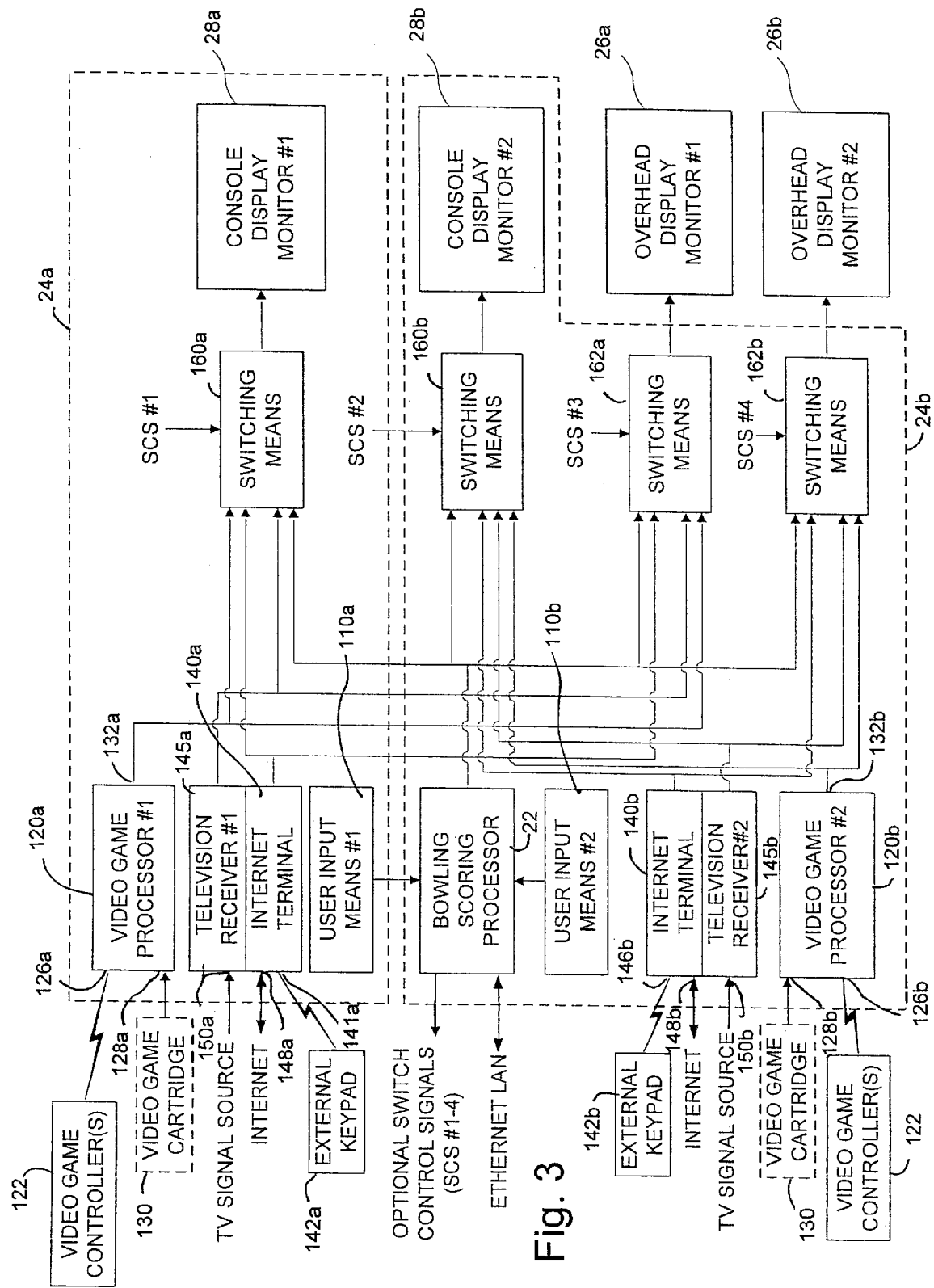
FIG. 3 is an electrical circuit diagram in block form of a scoring system for a pair of bowling lanes constructed in accordance with the present invention.

As shown in FIG. 2B, scoring console 24 also includes an Internet access device 140 and/or a video game processor 120 mounted in housing 100. As shown in FIGS. 2B and 3, scoring console 24 may also include a television receiver 145. Internet access device 140 and television receiver 145 may be parts of a single "web television unit" or separate components. One such web television unit is Internet Terminal MAT972A1 available from Phillips Magnavox. A web television unit may also be implemented using a personal computer equipped with a modem (or other means for connection to the Internet) and a television tuner card. When Internet access device 140 and television receiver 145 are provided in a web television unit, a single output port is provided from which is transmitted a generated display signal corresponding to the selected television broadcast and/or the selected Internet web site. If implemented separately, Internet access device 140 and television receiver 145 each have their own output ports. The specific manner by which the display signal(s) from the web television unit or separate Internet access device 140 and television receiver 145 are delivered to one or more displays 26 and 28 is described in detail below.

Internet access may also be provided through a local area network (LAN), whereby each of the scorers is connected to a server via an Ethernet connection or the like, and where the server includes means for accessing the Internet. Such LAN/Internet connections are generally well known in the art in office environments.

Internet access device 140 includes an input port 148 (FIG. 3) for direct or indirect connection to the Internet (via an Internet Service Provider (ISP)). Television receiver 145 includes an input port 150 for direct or indirect connection to a source of television signals, such as a television antenna, cable television, or a satellite dish. Additionally, the television receiver and Internet access devices include input ports for connection to user input devices. When implemented as a single web television unit, a single input port 146 may be provided for receiving control signals from an external keypad 142 for both the television receiver and the Internet access device. Port 146 may be a female jack for direct electrical coupling to keypad 142 or may be an infrared (IR) or radio frequency (RF) receiver for wireless coupling to the web television unit. The web television unit responds to control signals from external keypad 142 by selecting or changing a television channel and/or by navigating the Internet or entering information for transmission through the Internet. To enable control signals to be transmitted to the web television unit within housing 100, a window 144 may be provided in housing 100 to allow IR signals to reach the IR receiver of the web television unit, or a jack 139 may be provided on housing 100 and electrically coupled to the jack of the web television unit for electrically coupling external keypad 142 thereto. The web television unit or Internet access device 140 may also receive input from a user via voice commands through connection to a microphone, which may be the microphone of the intercom system already existing in the scoring console. Alternatively, virtually any input device may be used.

Video game processor 120 and game controllers 122a–122d may be any commercially available video game system, such as those available from Nintendo, Sony, Sega, etc. Video game processor 120 is mounted within housing 100 while game controllers 122a–122d are maintained external to housing 100. Commercially available video game systems may operate with one to four controllers 122, which may be in communication with processor 120 by wired or wireless links. Thus, video game processor 120 has an input port for receiving control signals from the game controllers 122, which may be an IR receiver 126 or a plurality of female jacks (not shown) for wired electrical coupling. If video game processor 120 includes an IR receiver 126, housing 100 preferably includes a window 124 positioned in front of IR receiver 126 to allow IR signals to pass therethrough. Alternatively, if video game processor 120 includes female jacks for wired connection to game controllers 122, housing 100 may be provided with a plurality of corresponding female jacks 129 that are internally hardwired to the female jacks of video game processor 120 so as to allow easy connection of controllers 122 to processor 120.

Available video game processors also typically include a slot 128 (FIG. 2B) for receiving game program cartridges 130. To allow access to slot 128 and thereby allow for the selection of different video games, housing 100 may include an access panel 102 that may be moved to gain access to both video game processor 120 and web television unit 140 via an opening 104. Access panel 102 may be biased to close when a force is not applied to keep it open.

Video game processor 120 also includes a video output port 132 from which the video a display signal is output for display on one of display monitors 26 and 28.

As shown in FIG. 2A, scoring console 24 may also include an intercom speaker 60 and a pair of speakers 170a and 170b, which may be connected to video game processor 120, Internet access device, and/or television receiver 145, and are preferably mounted within housing 100. A headphone jack 172 may also be provided on housing 100 so as to allow the user to listen to an audio signal provided by video game processor 120, television receiver 145, and/or Internet access device 140 using a set of headphones (not shown).

Scoring console 24 may also include means disposed in housing 100 for receiving credit/debit card information. Such means may include a credit/debit card reader 52 for reading information therefrom stored on a magnetic strip. Such credit/debit card readers are well known and are in use in gas pumps and grocery store checkouts. Alternatively, the means for receiving credit/debit card information may be input means 100 when scoring processor 22 connected thereto is programmed to receive credit/debit card information through manual keyboard entry. By providing a credit/debit card information receiving means in scoring console 24, individuals may charge the fees for bowling games, food and beverage service, video game use, Internet access, etc. to their credit/debit card. By providing the combination of a credit/debit card reader 52 and Internet access device 140, the Internet access device may be used to access the Internet upon reading a user's credit card number and retrieve information about other purchases the user has made. This information may then be used to select and display advertising to the user or to select initial Internet (or Intranet) websites to display to the user.

FIG. 3 shows an electrical circuit block diagram of a pair of scoring consoles 24a and 24b as preferably implemented for each pair of bowling lanes. As illustrated, a first console 24a includes a video game processor 120a, an Internet access device 140a, a television receiver 145a, and user input means 110a, which is coupled to a bowling scoring processor 22 external to console 24a. Console 24a preferably includes a display monitor 28a. If the scoring system includes an overhead display 26a, however, a display monitor need not be included in console 24a. If console 24a does include display monitor 28a, console 24a may also include switching means 160a, which is coupled between the output ports of video game processor 120a, Internet access device 140a, television receiver 145a, and bowling scoring processor 22 and the input port of monitor 28a. Switching means 160a is thus used to select the display signal output from one of video game processor 120a, Internet access device 140a, television receiver 145a, and bowling scoring processor 22, and to supply the selected display signal to monitor 28a for display thereon. Switching means 160a may be a manually-actuated switch, such as a push-button, toggle, or turnkey-activated switch, and/or may be an electrically controlled switch responsive to a switch control signal (SCS #1) supplied from or through bowling scoring processor 22. For example, a bowling center employee or central processor may operate the switch remotely using the front desk computer by sending an appropriate control signal to scoring processor 22.

Scoring console 24b preferably includes its own video game processor 120b, Internet access device 140b, and television receiver 145b, as well as its own display monitor 28b and user input means 110b. Like console 24a, console 24b may include switching means 160b for selectively coupling the output ports of video game processor 120b, Internet access device 140b, television receiver 145b, and bowling scoring processor 22 and the input port of monitor 28b. As shown in FIG. 3, console 24b may be used to house bowling scoring processor 22, although processor 22 may be mounted elsewhere. Also, switching means 160a and 160b may be mounted external of the console housings.

Scoring console 24b may also include switching means 162a and 162b, respectively, associated with overhead display monitors 26a and 26b. Switching means 162a and 162b may selectively couple the input ports of overhead monitors 26a and 26b to bowling scoring processor 22 to one of Internet access devices 140a and 140b, television receivers 145a and 145b, or to video game processors 120a and 120b. In this manner, the images to be displayed on overhead monitors 26 may be selected as may the images on console displays 28. Thus, the bowling scores for a lane may be displayed on either the console or overhead monitors, while the other monitor is used to display selected television broadcasts, Internet web sites, or video games. Further, one of the console or overhead monitors could be used to display a video game, while the other is used to display selected television broadcasts and/or Internet web sites. Further still, both the console and overhead monitors could be used to display the same images provided from one of bowling scoring processor 22, video game processor 120, Internet access device 140, or television receiver 145.

While the preferred embodiment is shown as including a video game processor 120, an Internet access device 140, and a television receiver 145 in each console of a lane pair, a single video game processor 120, television receiver 145, and/or Internet access device 140 could be provided per lane pair while possibly providing access to video game processor 120, Internet access device 140, and/or television receiver 145 from both consoles 24a and 24b (if two consoles are provided per lane pair). In this manner, an Internet access device 140 could be provided in one of consoles 24a and 24b, while video game processor 120 may be provided in the other console thereby allowing smaller console housings to be used. Although it is preferred that each lane or lane pair be provided with both video games and Internet access, it should be noted that a video game processor 120 and an Internet access device 140 need not both be provided for a lane or lane pair. Additionally, a bowling scoring processor 22 may be provided for each lane or for varying numbers of lanes without departing from the scope of the present invention.

Housing 100 preferably is constructed similar to the housing described in commonly assigned U.S. Pat. No. 5,719,548. The scoring console housing described in the '548 patent has a two-piece outer shell and an internal support base, where the back half of the housing shell may be removed without having to lay the console on its side while allowing easy access to the internal components. The scoring console described in the '548 patent also provides a watertight seal between the housing and the screen of the display monitor.

In the illustrated embodiment, automatic scoring system 20 utilizes an open architecture, which allows assembly of the system substantially from off-the-shelf components utilizing an ISA bus standard and an Ethernet communication network. In this manner, bowling scoring processor 22 may be readily upgraded for enhanced microprocessor technology and the communication system is supported by industrial standard communication technology.

Figure 4A:
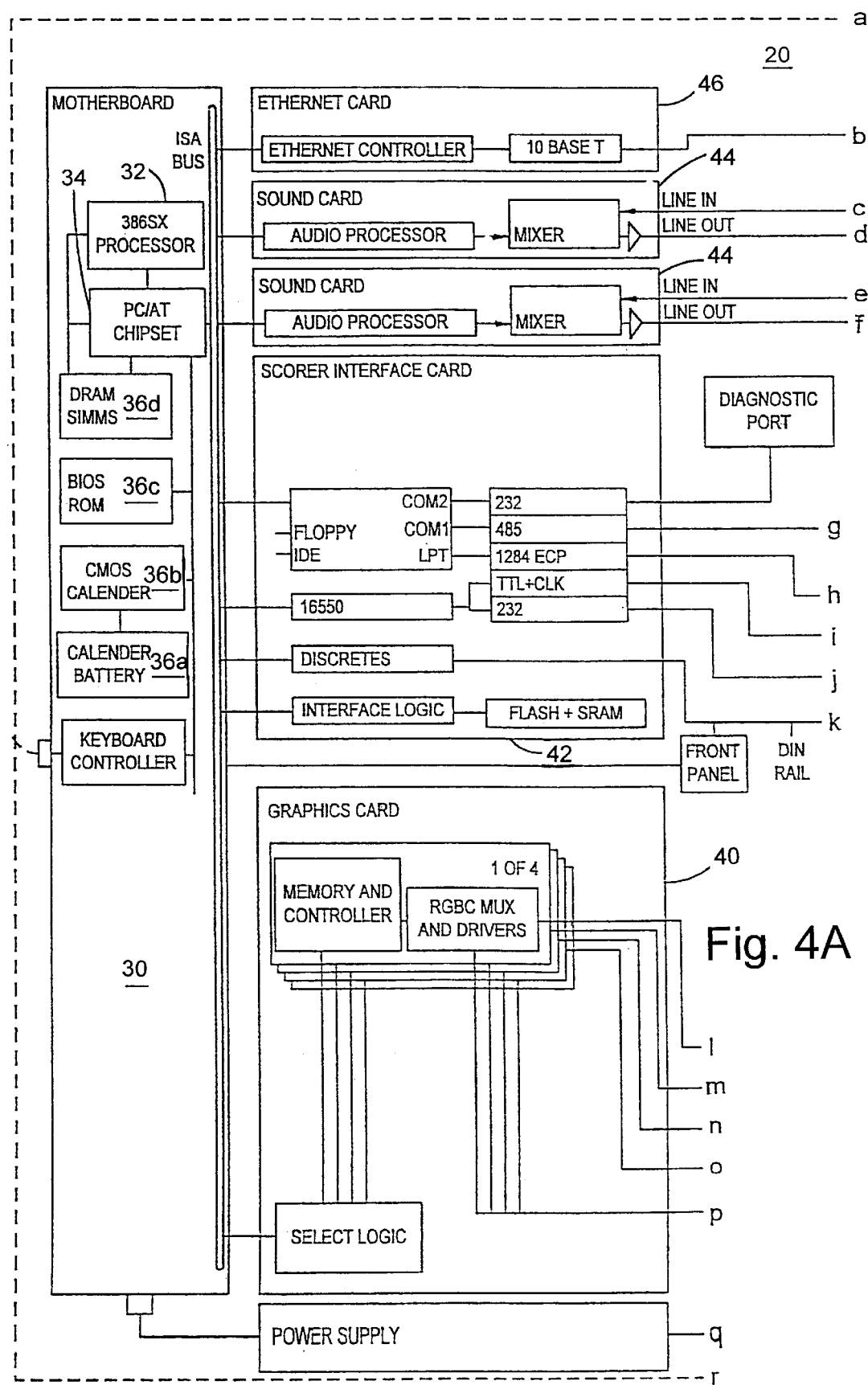
FIGS. 4A and 4B are detailed electrical circuit diagrams in block form of the bowling scoring system in FIG. 3.
Figure 4B:
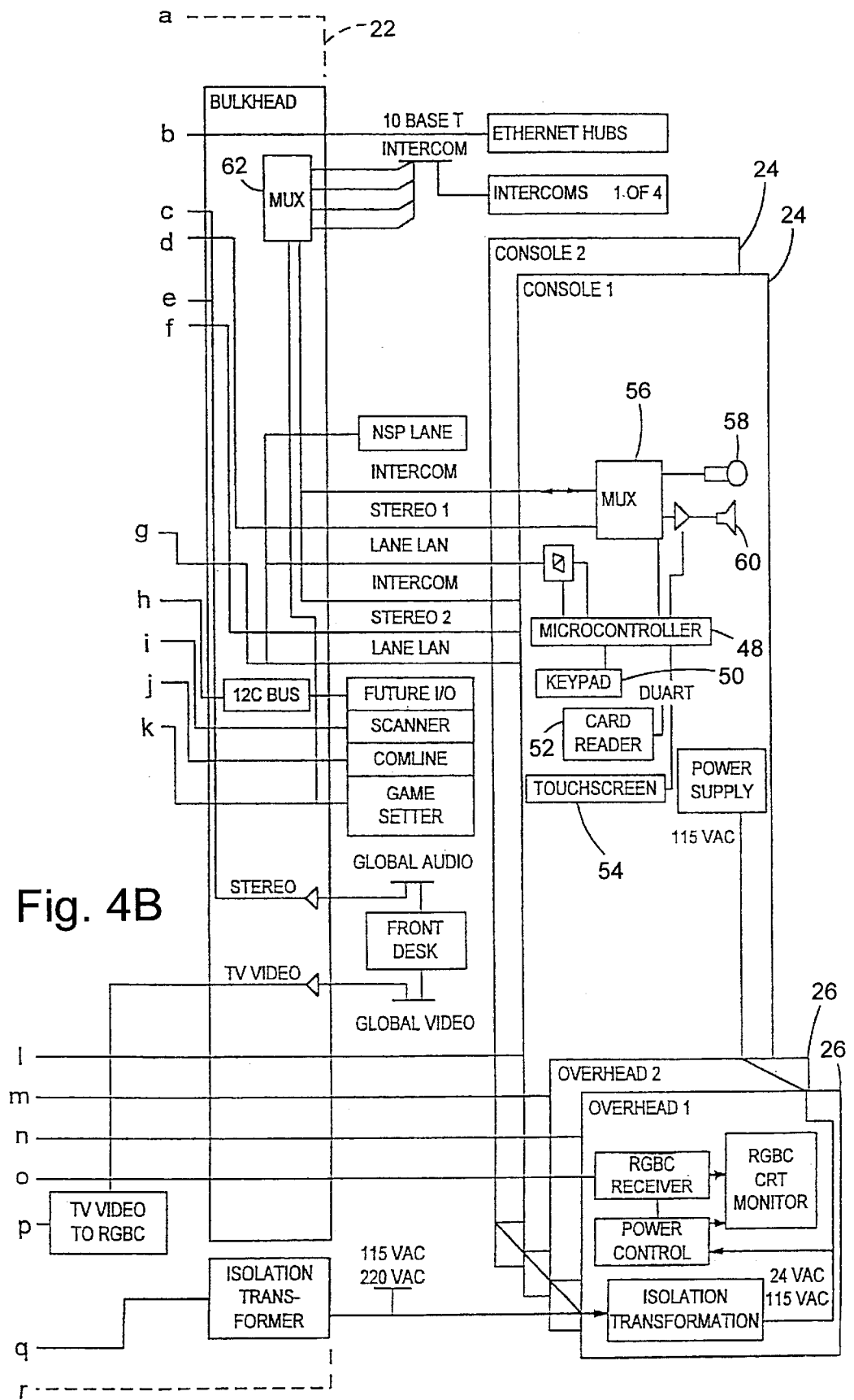
Figure 5A:
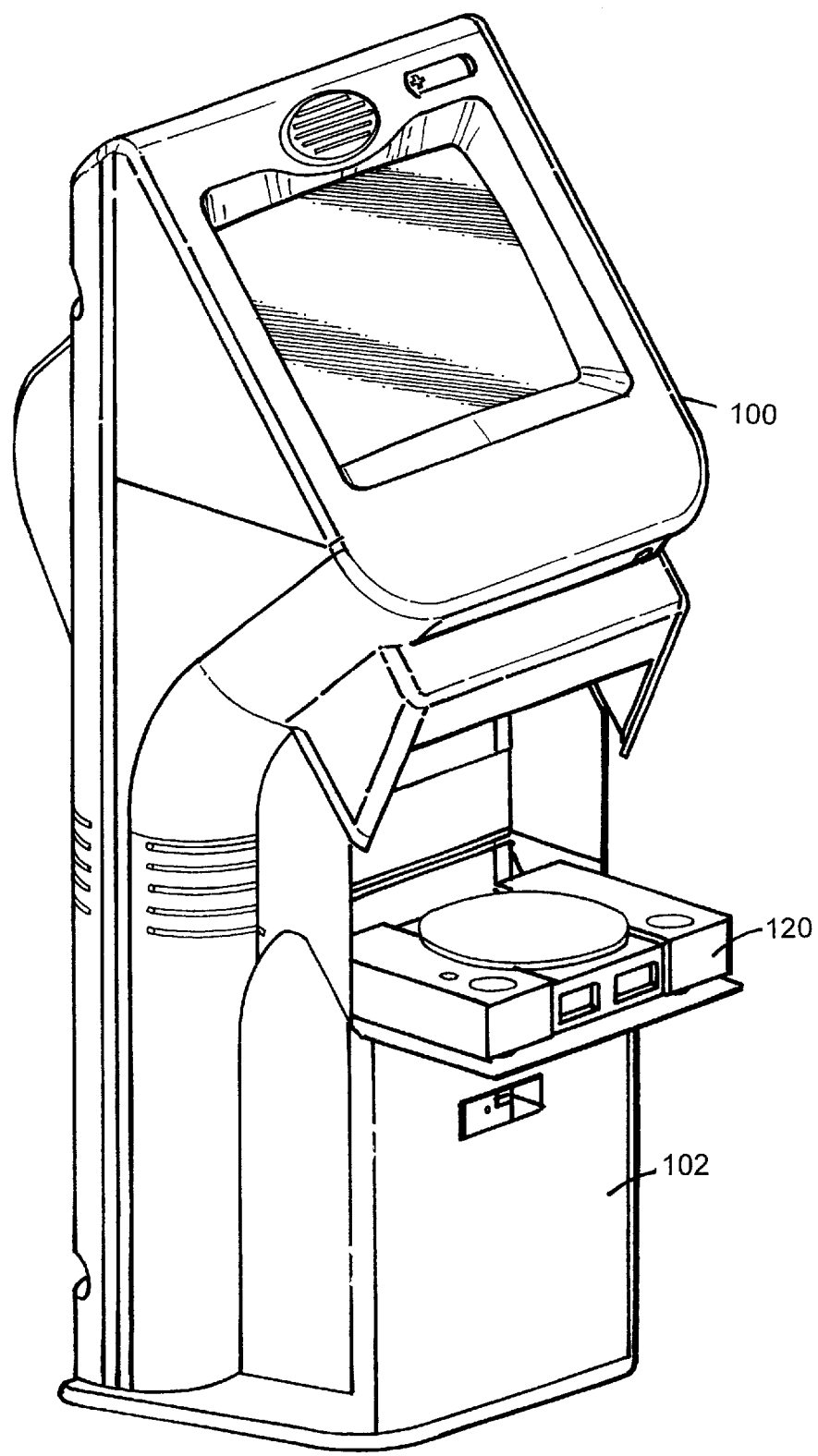
FIGS. 5A–5D are side elevational views of a bowling scoring console constructed in accordance with a second embodiment of the present invention.
Figure 5B:
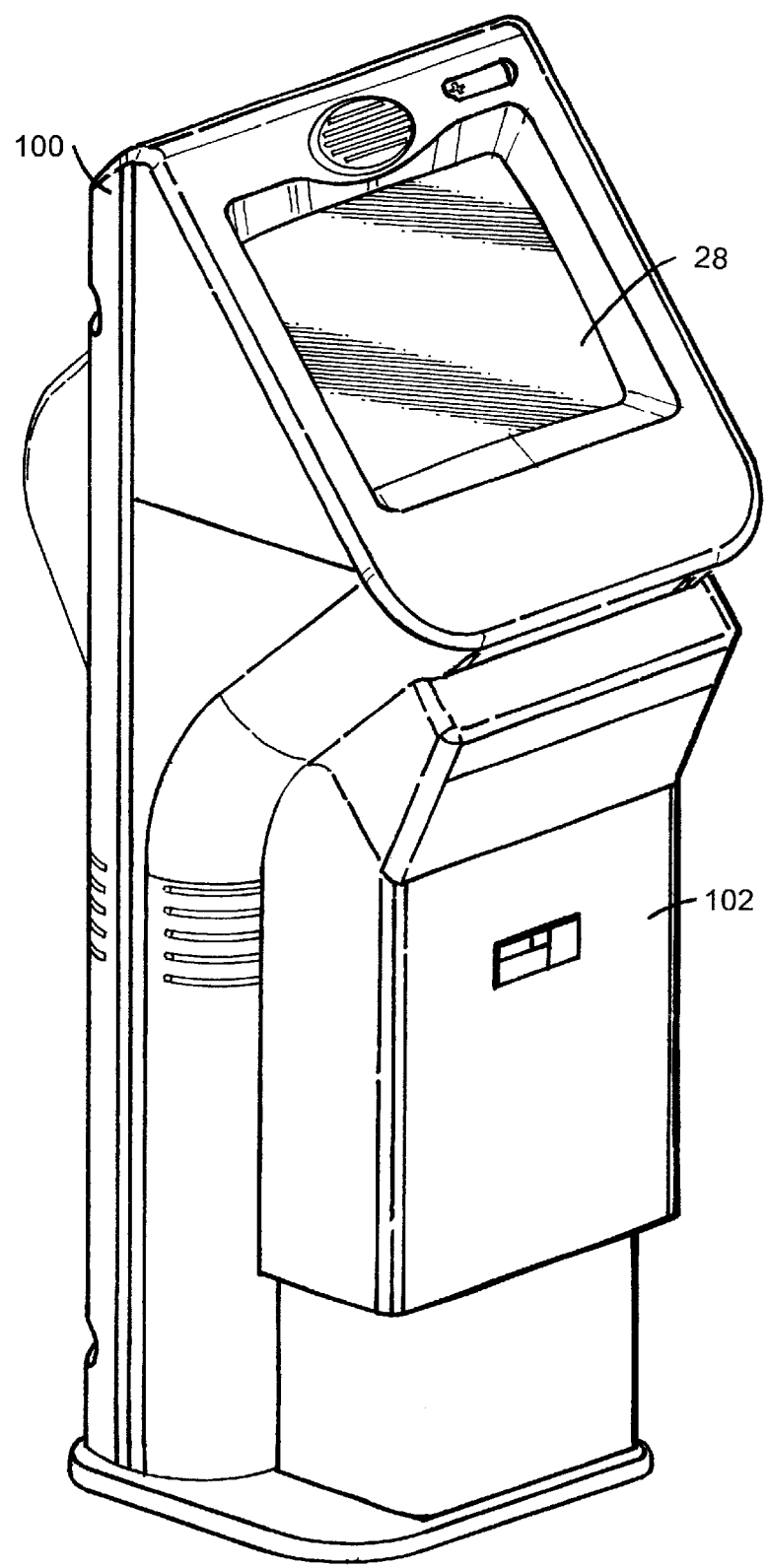
Figure 5C:
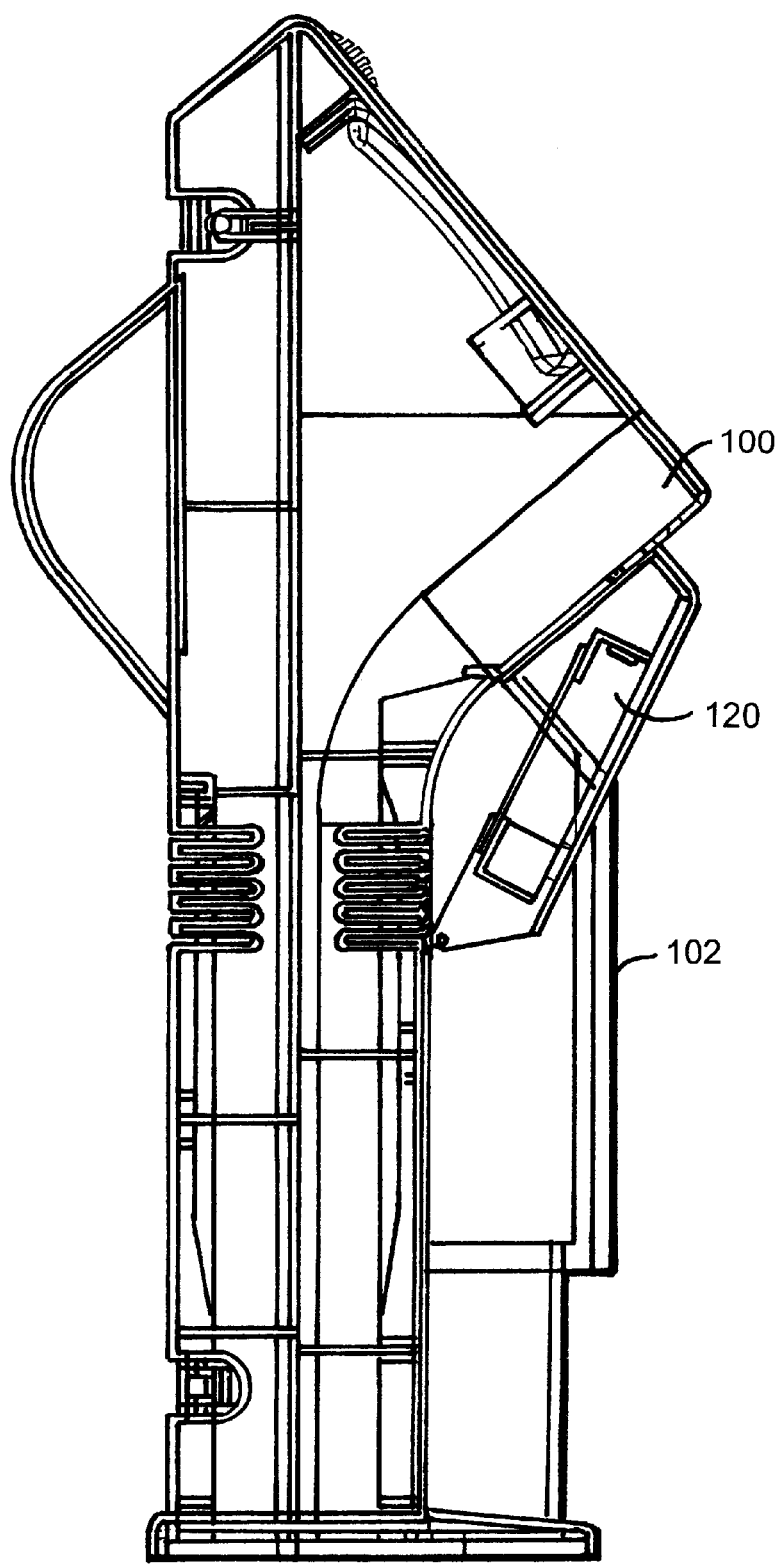
Figure 5D:
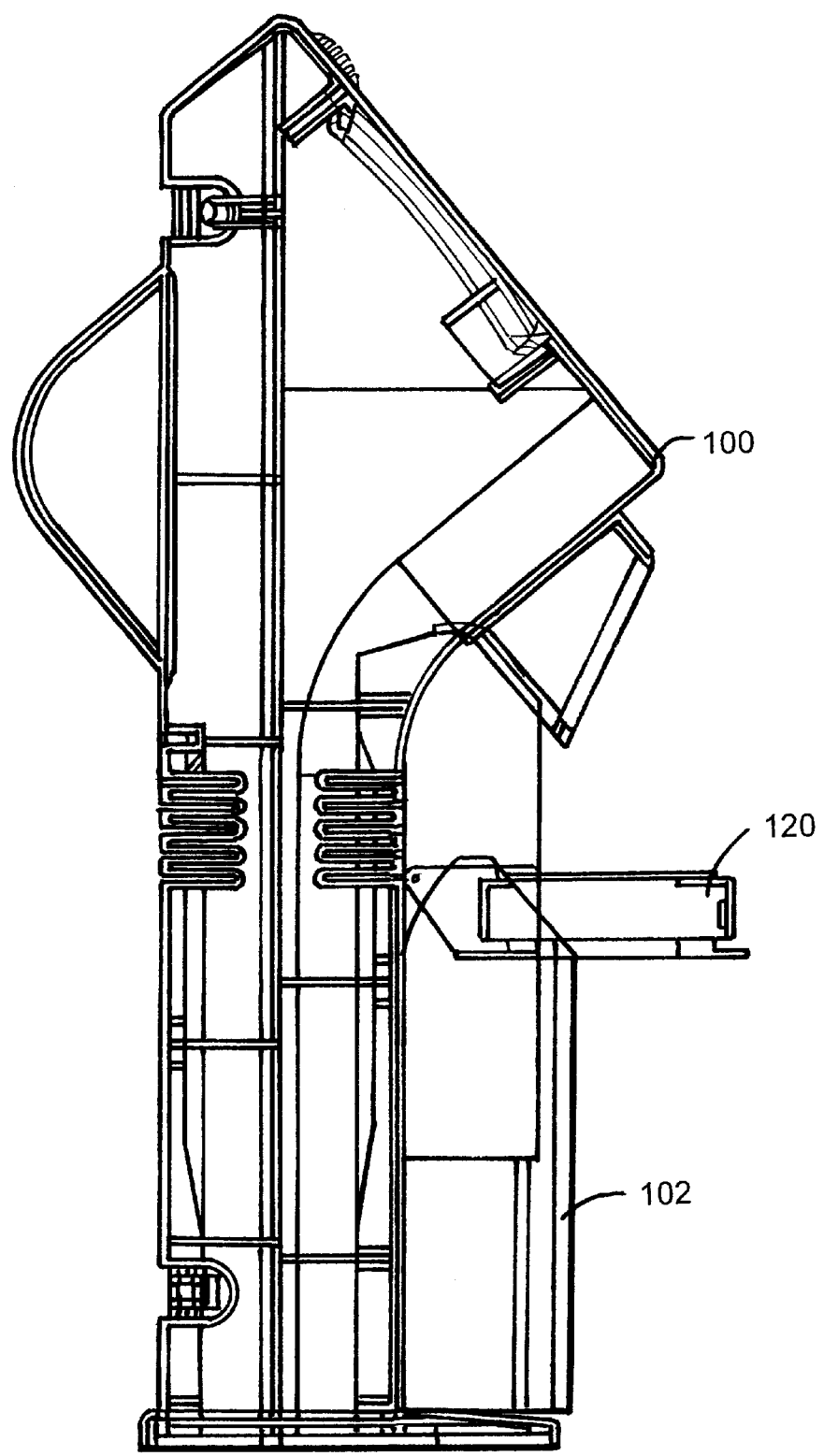

As shown in FIGS. 4A and 4B, each bowling scoring processor 22 includes a mother board 30 having off-the-shelf components, such as a Pentium®III processor 32, a PC/AT chip set 34, and other conventional components 36a–36d. A mother board bus 38, which has a protocol according to ISA standards, supports a multiplexed graphics interface card 40 for supplying video signals to displays 28 for a pair of scoring consoles 24, as well as a pair of overhead monitors 26. Mother board bus 38 additionally interfaces with a scorer interface card 42, which, in turn, provides interface with a pair of scoring consoles 24 for data other than graphic and audio data. A pair of sound cards 44 provides interface between ISA bus 38 and microphones 60 in a pair of scoring consoles 24. An Ethernet card 46 interfaces ISA bus 38 with a 10 Base T hub utilizing standard Ethernet protocol. Each scoring console 24 includes a microcontroller 48 in order to receive inputs from a keypad 50 or a touch-screen 54 and to communicate with scoring processor 22. Microcontroller 48 additionally receives inputs from a card reader 52, which may be used to read the information contained on the magnetic strip on a credit or debit card. A multiplexer 56 allows a microphone 58 and a speaker 60 to be utilized with either a stereo input channel received from a sound card 44 or from an intercom multiplexer 62. Intercom multiplexer 62 multiplexes each microphone/speaker combination of each console 24 onto one of four intercom lines that are each connected to a speaker telephone at a central control console.

Scoring console 24 may include a plurality of unlabeled user input selection buttons or switches, which are distributed along the bottom of display surface 28. Display 24 may be configured to display a plurality of indicia areas, which are juxtaposed with the input keys. Alternatively, a touch-screen may be provided on display 28, which includes a combination of user selection keys directly overlaying the associated indicia areas. Each key indicia area includes an indicia that prompts the user of the function performed by the corresponding selection key. The indicia in each indicia area are established by the state of the software operating microcontroller 48. Likewise, the function carried out by actuation of each of the selection keys changes depending upon the state of the software of the micro-controller 48. This soft-key specification of the function of each key is described in commonly assigned U.S. Pat. No. 5,618,238.

Although the invention has been described above as including separate components for the bowling scoring system, Internet access device 140, television receiver 145, and video game processor 120, it will be appreciated by those skilled in the art that the functions of these devices may be implemented in a single PC. Because the PC may include its own mechanisms for switching between signals that are displayed on a connected display monitor, the need for any separate switching means would then be eliminated and the user would likely switch between the various functions by entry on a user input device to which the common personal computer would respond by changing the display.

By providing a modem and phone line for each bowling scoring console, the bowling scoring consoles may be accessed from a remote terminal so as to track revenue at a bowling center; track who is bowling, playing video games, browsing the Internet and where, etc.; and to track how long these people are spending at these activities. In addition, remote diagnostics may be performed on the bowling scoring consoles and bowling scoring system as a whole, as well as the ability to turn the system, components, and/or functions on and off from a remote location.

While the preferred embodiments have been described above as including video game processor 120 or Internet access device 140 in a bowling scoring console, such components need not be located in a bowling scoring console. In accordance with the broadest principles of the present invention, the invention may be practiced by providing Internet access and/or video games at a staging area of a bowling center. Ideally, the Internet access device and the video game processor utilize one or more of the display monitors of the bowling scoring system so as to eliminate the need to provide any additional display monitors at each staging area and thereby reduce the cost of implementing the present invention. While the Internet access device and the video game processor may be coupled to one or more display monitors of the bowling scoring system, it is possible to provide access via an externally accessible video input port located on the housing of a scoring console. In this manner, video game processors and/or Internet access device boxes may be rented out at the front desk or brought in by the customer and plugged into the external video input port on the scoring console. The rented video game processor could be placed on a table in front of the scoring processor (see FIG. 1). By maintaining the video game processors external to the scoring processors and allowing such a connection to the display monitors of the bowling scoring system, individuals may select from various game systems of different manufacturers (i.e., Sony, Sega, Nintendo, etc.) Also, this would allow bowling center proprietors to implement the present invention without purchasing and installing video game processors at each lane, while still allowing video games to be played at any staging area in the bowling center.

Although the present invention has been described as providing the functionality of a video game processor, Internet access device, and/or television receiver for each lane or each lane pair, it would also be possible to provide the functionality for each monitor provided in the bowling center. Thus, if there are two to three display monitors per lane, two to three video game processors could be provided within a scoring console associated with the lane. Alternatively, one video game processor may be provided in the scoring console with additional input ports accessible from the outside of the scoring processor so as to enable additional game processors to be connected and used through the remaining display monitors associated with the lane.

In addition, the ability to provide non-bowling recreation devices within scoring consoles need not be limited to an Internet access device, television receiver, nor video game systems. Other forms of non-bowling recreation devices may be readily incorporated into each bowling scorer and utilized in any of its components including its display monitor's input keypad, speakers, intercom system, etc.

FIGS. 5A–5D disclose a bowling scoring console constructed in accordance with a second embodiment of the present invention. As shown, the scoring console similarly includes an access panel door 102 that opens on the front of the console housing 100 to enable a shelf to pivot downward and thereby enable access to a video game processor 120.

Although the present invention has been described with respect to bowling centers, the concepts described herein may be used outside of bowling scoring centers. For example, a kiosk could be constructed have a structure similar to the bowling scoring console described above. Such a kiosk could thus provide Internet access, allow transmittal and retrieval of e-mail, provide television viewing, and/or provide playing of video games against others at the kiosk or others remote therefrom via the Internet. Such a kiosk would preferably include some means for entry of a credit/debit card number or provide some other means for establishment of an account so as to charge individuals for their use. Such kiosks would be particularly desirable in locations such as airports where individuals are forced to remain in a location without much, if any, entertainment. Even in airports where televisions are provided, patrons are forced to watch whatever television broadcast the airport authorities choose. A kiosk made in accordance with the present invention would thus allow patrons to select and view the television channel they wish to view.

The kiosks of the present invention would preferably include a personal computer having a modem or other means for Internet access and a television tuner card. A display monitor may be provided as is provided on the bowling scoring console described above and shown in the drawings. A general purpose or custom-designed keyboard may be mounted in the kiosk similar to keypad 50 described above and/or a touch screen may be provided. Obviously, a kiosk that is not provided in a bowling environment need not include a bowling scoring processor. The kiosk, however, may be equipped with a printer and/or scanner so as to enable scanning, printing, faxing, and copying, in addition to all of the features and functions available through the provision of a fully functional personal computer.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A method of providing access to information at the staging area of a bowling lane comprising the steps of:
    positioning a display monitor at a staging area of a bowling lane in a bowling center;
    connecting a bowling scoring processor to the display monitor;
    connecting an Internet access device to the display monitor;
    connecting a video game processor to said display monitor;
    providing at least one game controller having a communication link to said video game processor at the staging area of the bowling lane; and
    providing a switching means for user selection of a display signal output from one of the video game processor, Internet access device, and bowling scoring processor to provide the selected display signal to the display monitor.

2. The method as defined in claim 1, wherein said display monitor is an overhead display for a bowling scoring system on which video games, Internet websites, and bowling scores may be selectively displayed.

3. The method defined in claim 1 and further including the steps of providing a bowling scoring console at the staging area of the bowling lane and providing said display monitor, said Internet access device, and said video game processor within said bowling scoring console.

4. The method as defined in claim 3 and further including the step of mounting said display monitor in said bowling scoring console.

5. A method of using an Internet access device comprising the steps of:
    positioning a display monitor at a staging area of a bowling lane in a bowling center;
    connecting a bowling scoring processor to the display monitor;
    connecting an Internet access device to said display monitor;
    providing a keypad having a communication link to said Internet access device at the staging area of the bowling lane; and
    enabling selective access to bowling scores tracked for at least one lane and Internet access at the staging area of the bowling lane using said keypad and said Internet access device.

6. The method as defined in claim 5 and further including the step of providing a television receiver coupled to the display monitor for selecting and viewing television broadcasts at the staging area.

7. The method as defined in claim 5, wherein said display monitor is an overhead display.

8. The method as defined in claim 5 and further including the steps of providing a bowling scoring console at the staging area of the bowling lane and providing said video game processor within said bowling scoring console.

9. The method as defined in claim 8 and further including the step of mounting said display monitor in said bowling scoring console.

10. A bowling scoring system, comprising:
    a bowling scoring processor for tracking bowling scores on at least one bowling lane and for generating display signals for display of bowling scores;
    a first scoring console having a housing;
    first user input means provided on said housing of said first scoring console and coupled to said bowling game scoring processor for receiving user input;
    a first Internet access device adapted for connection to the Internet, said Internet access device generates display signals corresponding to a selected Internet website; and
    a display monitor coupled to said bowling scoring processor and to said Internet access device for selectively receiving display signals and displaying at least bowling scores and Internet websites.

11. The bowling scoring system as defined in claim 10, wherein said display monitor is provided in said housing of said first scoring console.

12. The bowling scoring system as defined in claim 10, wherein said display monitor is mounted over the staging area of the pair of bowling lanes.

13. The bowling scoring system as defined in claim 10, wherein said first Internet access device is disposed in said first scoring console.

14. The bowling scoring system as defined in claim 10, wherein said Internet access device is in a web television unit adapted for connection to a source of television signals, and wherein said display monitor is coupled to said web television unit for display of a selected television broadcast signal.

15. The bowling scoring system as defined in claim 14, wherein said web television unit is mounted in said housing of said first scoring console.

16. The bowling scoring system as defined in claim 10, wherein said bowling scoring processor is mounted in said housing of said first scoring console.

17. The bowling scoring system as defined in claim 10 and further including:
   a second scoring console having a housing; and
   second user input means mounted on said second scoring console.

18. The bowling scoring system as defined in claim 17 and further including a second Internet access device in said housing of said second scoring console.

19. The bowling scoring system as defined in claim 10, wherein said bowling scoring processor tracks and displays scores for more than one lane.

20. The bowling scoring system as defined in claim 10 and further including a switch coupled between outputs of said bowling scoring processor and said first Internet access device and an input of said display monitor for selection of a display signal for display on said display monitor.

21. The bowling scoring console of claim 10 comprising:
   a video game processor disposed in said housing for generating display signals in response to a video game program and control signals received from at least one game controller; and
   the display monitor mounted to said housing and coupled to said bowling game scoring processor and to said video game processor for selectively receiving the display signals and displaying at least one of Internet website, video game displays and bowling scores.

22. The bowling scoring console as defined in claim 21, wherein said video game processor includes a port for receiving video game cartridges on which at least one video game program is stored.

23. The bowling scoring console as defined in claim 22, wherein said housing includes an opening through which said port is accessible.

24. The bowling scoring console as defined in claim 21, wherein said housing includes at least one input port coupled to said video game processor for receipt of control signals from the at least one external game controller.

25. The bowling scoring console as defined in claim 24, wherein said input port is an infrared receiver for receiving infrared signals from the at least one external game controller, the infrared signals including the control signals to which the video game processor is responsive.

26. The bowling scoring console as defined in claim 24, wherein said input port is a female jack for electrical connection to a coupling wire extending from one of the at least one game controllers.

27. The bowling scoring console as defined in claim 21, wherein said housing includes an access panel that may be moved to gain access to said video game processor.

28. The bowling scoring console as defined in claim 21 and further including means disposed in said housing for receiving credit/debit card information.

29. The bowling scoring console as defined in claim 28, wherein said means for receiving credit/debit card information includes a credit/debit card reader.

30. The bowling scoring console as defined in claim 21 and further including a web television unit disposed in said housing and adapted for connection to the Internet and to a source of television signals, said web television unit generates display signals corresponding to a selected television signal or to a selected Internet website, wherein said display monitor is further coupled to said web television unit for selectively receiving display signals and displaying at least bowling scores, video game displays, a television broadcast, and an Internet website.

31. The bowling scoring console as defined in claim 21, wherein said at least one game controller is located external to said housing.

32. A bowling scoring system, comprising:
   a bowling scoring processor for tracking bowling scores on at least one bowling lane and for generating display signals for display of the bowling scores;
   a first scoring console having a housing;
   first user input means provided on said housing of said first scoring console and coupled to said bowling game scoring processor for receiving user input;
   a web television unit adapted for connection to the Internet, the web television unit connected to receive and display time delayed player bowling information;
   a display monitor coupled to said bowling game scoring processor and to said web television unit for selectively receiving display signals and displaying at least one of the time delayed player bowling information and real time bowling scores.

33. The bowling scoring system as defined in claim 32, wherein said display monitor is provided in said housing of said first scoring console.

34. The bowling scoring system as defined in claim 32, wherein said display monitor is mounted over the staging area of the pair of bowling lanes.

35. The bowling scoring system as defined in claim 32, further comprising a first video game processor disposed in said first scoring console and connected to the display monitor, the display monitor further adapted for selectively displaying video game displays.

36. The bowling scoring system as defined in claim 32, wherein said bowling scoring processor is mounted in said housing of said first scoring console.

37. The bowling scoring system as defined in claim 32 and further including:
   a second scoring console having a housing; and
   second user input means mounted on said second scoring console.

38. The bowling scoring system as defined in claim 37 and further including a second video game processor in said housing of said second scoring console.

39. The bowling scoring system as defined in claim 32, wherein said bowling scoring processor tracks and displays scores for both lanes of the pair of lanes.

40. The bowling scoring system as defined in claim 32 and further including a switch coupled between outputs of said bowling scoring processor and said first video game processor and an input of said display monitor for selection of a display signal for display on said display monitor.

41. A bowling scoring console comprising:

a housing;

a bowling game scoring processor disposed in said housing for tracking bowling scores on one or more associated bowling lanes and for generating display signals for display of the bowling scores;

user input means provided on said housing and coupled to said bowling game scoring processor for receiving user input;

an Internet access device disposed in said housing and adapted for connection to the Internet and equipped with a web camera for generating display signals corresponding to a video transmission of bowling activity between separate bowling centers; and a display monitor mounted to said housing and coupled to said bowling game scoring processor and to said web television unit for selectively receiving display signals and displaying at least bowling scores and video transmissions of bowling activity.

42. The bowling scoring console as defined in claim 41, wherein said Internet access device includes an input port adapted to receive control signals from an external keypad, said Internet access device being responsive to the control signals from the external keypad to select an Internet website for display on said display monitor.

43. The bowling scoring system of claim 21 comprising:

at least one display monitor provided for each bowling lane, said display monitor having an input port for receiving a video signal for display on said display monitor to provide for external access with a user selected video game processor;

at least one bowling scoring console provided for each bowling lane or lane pair, said bowling scoring console including a housing having an externally accessible video input port mounted therein, said video input port being coupled to a switch that selectively couples said video input port to said input port of said display monitor such that an external source of video signals may be coupled to said display monitor; and a bowling scoring processor coupled to said display monitor for tracking bowling scores on at least one bowling lane and for generating display signals for display of the bowling scores on a display monitor.

44. A kiosk console comprising:

a housing;

a display monitor provided in said housing;

at least one speaker provided in said housing;

an Internet access device provided in said housing and coupled to said display monitor and to said speakers, said Internet access device adapted for connection to the Internet for generating display and audio signals corresponding to a selected Internet website;

a television receiver provided in said housing and coupled to said display monitor and to said speakers, said television receiver adapted for connection to a source of television signals for generating display and audio signals corresponding to a selected television broadcast signal; and a video game processor provided in said housing and coupled to said display monitor and to said speakers, said video game processor generates display and audio signals in response to a video game program and control signals received from at least one game controller, wherein said display monitor selectively receives display signals and displays at least video game displays, television broadcasts, and Internet websites, and said speakers play audio signals received from said video game processor, said Internet access device, and said television receiver.

* * * * *

UNITED STATES PATENT AND TRADEMARK OFFICE
CERTIFICATE OF CORRECTION

PATENT NO. : 6,764,410 B2 Page 1 of 1
DATED : July 20, 2004
INVENTOR(S) : Apple et al.

It is certified that error appears in the above-identified patent and that said Letters Patent is hereby corrected as shown below:

Column 15,
Line 27, after the word "claim", please replace "21" with -- 32 --

Signed and Sealed this

Seventh Day of September, 2004

JON W. DUDAS
*Director of the United States Patent and Trademark Office*